P. G. DONALD.
ROLLER BEARING APPLICABLE TO GRAVITY RUNWAYS OR OTHER PURPOSES.
APPLICATION FILED MAY 28, 1918.
1,300,590.
Patented Apr. 15, 1919.
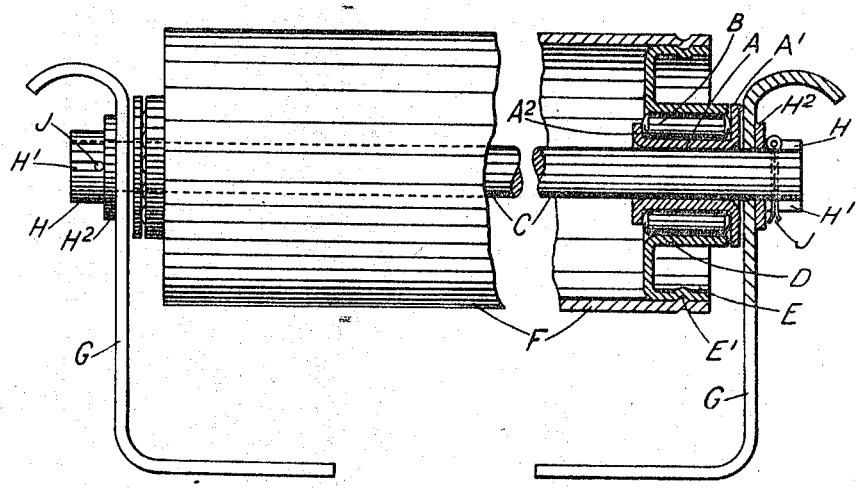
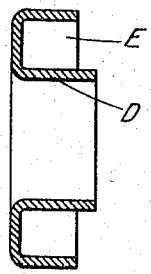
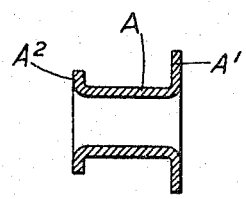

UNITED STATES PATENT OFFICE.

PERCY GEIKIE DONALD, OF LONDON, ENGLAND.

ROLLER-BEARING APPLICABLE TO GRAVITY-RUNWAYS OR OTHER PURPOSES.

1,300,590.     Specification of Letters Patent.     Patented Apr. 15, 1919.

Application filed May 28, 1918. Serial No. 237,158.

*To all whom it may concern:*

Be it known that I, PERCY GEIKIE DONALD, a subject of the King of Great Britain and Ireland, of 225 Upper Thames street, London, E. C., England, have invented new and useful Improvements Relating to Roller-Bearings Applicable to Gravity-Runways or other Purposes, of which the following is a specification.

My present improvements relate to roller bearings applicable to gravity runways or other purposes, my object being to provide a form of such bearing in which there are only two members besides the rollers, such members being simple stampings, preferably of mild steel.

Reference will hereinafter be made to the accompanying drawings, which illustrate a convenient form of my invention, showing a gravity runway by way of example.

Figure 1 is partly an end view and partly a longitudinal section of such a runway containing my said improved roller bearings.

Fig. 2 is a view of the outside race, and Fig. 3 of the inside race.

In carrying out my said invention, the inner and outer races of the roller bearing are pressed out of sheet steel as follows. The inner race upon which the rollers B run is a short tube A with outwardly directed flanges $A'$ $A^2$ upon the ends. The barrel portion A of the tube is just sufficiently longer than the rollers B as to give them an easy fit betwen the flanges $A'$ and $A^2$.

The ends of the rollers B may be rounded. The tube A is of such diameter as to be slid upon the axle C of the bearing, but need not be a tight fit. Alternatively it could be screwed on to the axle or fixed by a pin or otherwise, if desired.

The outer race has a cylindrical part D equal in length to the barrel A of the inner race, and having a larger diameter corresponding to the thickness of the rollers B. The other side of this cylindrical part D forms the inner wall of an annular U channel, the outer wall E forming the means by which it is held to the runway roller F.

When hollow or recessed-end rollers F are employed for gravity runways, the outer race forms a kind of plug, which could be solid, if desired, but is preferably flanged as at E to fit into the end. Obviously, it might be formed into a cap fitting over the end of the roller F.

One mode of assembling this improved roller bearing may be simply as follows. The inner race A being introduced on to the axle C, the rollers B are placed around it (between its flanges) and the outer race D is slid upon it, the cylindrical part of the same enveloping the rollers B, which are thereby prevented from escaping. The whole is then fixed into the hollow roller F of the runway or other equivalent housing.

A convenient way of fixing the bearing firmly in position is to provide one or two recesses $E'$ in the outer circumference of the outer race E, and then in the corresponding place in the surrounding runway roller F or the like (recognized by a marking) to punch the metal of the latter into such recesses $E'$, which keys the two permanently together. The exterior flange $A'$ on the inner race is sufficiently large to cover the ends of the rollers B, acting as a dust cap, and both flanges $A'$ $A^2$ assist in retaining lubricant. Withdrawal of the inner race A is prevented by its butting against the web G of the rail through which the axle passes, or a nut or any other suitable stop may be used for the purpose.

The bearing may be assembled in the reverse order, when necessary.

The axle C is prevented from being withdrawn from the retaining web G by a flanged ferrule H in the barrel part of which a diametric slot $H'$ (forming two slots) has been cut, and a hole is provided in the axle C, and a cotter J passed into such a hole through the slot $H'$. I do not confine myself, however, to this or any other form of ferrule.

To sum up, the present bearing comprises essentially a tube forming the inner race adapted to fit on to the axle, and is flanged outwardly at each end so as to retain the rollers endwise, there being another tubular or cylindrical member forming the outer race, and the inner race may be prevented from displacement inwardly by its outer flange butting against the outer race, said races furthermore being designed preferably so as to be stamped or pressed out of sheet metal.

I claim :—

1. A roller bearing comprising a tube forming the inner race adapted to fit on to an axle and flanged outwardly at each end to retain the rollers endwise and a tubular or cylindrical member forming the outer race, the latter being suitably connected to a load support.

2. In a roller bearing, a tubular member constituting an outer race, an inner race flanged outwardly at each end to retain antifriction members, an outward flare of the inner race etxending across an end of the outer race to prevent longitudinal movement of the inner race.

PERCY GEIKIE DONALD.

Copies of this patent may be obtained for five cents each, by addressing the "Commissioner of Patents, Washington, D. C."